United States Patent [19]

Stadler et al.

[11] Patent Number: 5,738,404
[45] Date of Patent: Apr. 14, 1998

[54] WIND DEFLECTING DEVICE FOR A CONVERTIBLE

[75] Inventors: Bernd Stadler, Weissach; Dieter Reuter, Ehningen; Matthias Aydt, Eberdingen, all of Germany

[73] Assignee: Dr. Ing. h.c.F. Porsche AG, Weissach, Germany

[21] Appl. No.: 761,786

[22] Filed: Dec. 6, 1996

[30] Foreign Application Priority Data

Dec. 6, 1995 [DE] Germany ............... 195 45 405.7

[51] Int. Cl.⁶ ................................................ B62D 35/00
[52] U.S. Cl. ....................... 296/180.1; 296/180.5; 296/136
[58] Field of Search .................... 296/180.1, 136, 296/85, 180.5

[56] References Cited

U.S. PATENT DOCUMENTS

| 4,890,876 | 1/1990 | Gaines . | |
| 5,211,718 | 5/1993 | Gotz et al. | 296/180.1 |
| 5,318,337 | 6/1994 | Gotz et al. | 296/180.1 X |

FOREIGN PATENT DOCUMENTS

| 0599811A1 | 6/1994 | European Pat. Off. . | |
| 3537644C1 | 4/1987 | Germany . | |
| 3844844C2 | 6/1989 | Germany . | |
| 3923558A1 | 3/1990 | Germany . | |
| 3914035C1 | 4/1990 | Germany . | |
| 4311240 | 4/1994 | Germany | 296/180.1 |
| 4335103C1 | 11/1994 | Germany . | |
| 4338102 | 5/1995 | Germany | 296/180.1 |

*Primary Examiner*—Joseph D. Pape
*Attorney, Agent, or Firm*—Evenson McKeown Edwards & Lenahan, PLLC

[57] ABSTRACT

A wind deflection device for a convertible comprises a first upright part which interacts by way of hinges with a second approximately horizontal part. According to the invention, the first part is formed by a flexible net mounted in a frame, whereas the second part is constructed as a plate-shaped covering which in the in use position blocks visibility of a luggage space.

17 Claims, 5 Drawing Sheets

WIND DEFLECTING DEVICE FOR A CONVERTIBLE

BACKGROUND AND SUMMARY OF THE INVENTION

This invention relates to a wind deflection device for a convertible.

During the drive, a strong vacuum is generated in the passenger compartment of a convertible which results in noisy air swirls which, in addition, are felt as annoying drafts.

For eliminating these problems, a wind deflection device is known from German Patent Document DE 35 37 644 C1 which comprises a plate-shaped covering arranged approximately at the level of the belt line and adapted to the circumferential contour of the rear passenger compartment and an upright protective pane mounted on the front edge of the covering. The protective pane and the covering are connected with one another by means of detent devices. In addition, the protective pane is laterally supported on the rollover bar.

This arrangement has the disadvantage that, because of the air impermeability of the upright protective pane, only a moderate wind protection is achieved. As a result of the air-impermeable protective pane, no pressure compensation takes place with respect to the passenger compartment which results in excess draft phenomena at non-tight locations (for example, gap areas). In addition, unpleasant noises may occur. When the deflection device is not in use, it is time consuming to demount it, and the protective pane and the plate-shaped covering must be accommodated in the vehicle separately from one another.

According to German Patent Document DE 38 44 844 C2, an improvement of the effect of the wind deflection device is achieved in that both parts of the wind deflection device are formed by one flexible net respectively mounted in a frame, both parts being connected with one another by hinges.

The two parts of the wind deflection device consisting of a bent extruded profile frame and a net covering cause high manufacturing costs. In addition, luggage pieces which are situated below the horizontal part of the wind deflection device on the rear seat unit are visible from the top through the flexible net (danger of theft). Furthermore, as the result of the direct radiation of the sun, luggage is exposed to heating and UV-stress. It is difficult to adapt the horizontal part of the wind deflection device to the contour of the vehicle interior.

It is an object of the invention to further develop a wind deflection device for a convertible such that, while the function is good, it can be produced at reasonable cost. In addition, luggage situated under the horizontal part should not be visible from the exterior side and, when it is not in use, the wind deflection device is to be accommodated in the vehicle in a simple and space-saving manner.

According to the invention, this object is achieved by providing a wind deflection device for a convertible which is arranged behind a row of seats and, in its operative position, comprises a first upright part which extends beyond the seats in the upward direction and along the whole width of the interior and which, with its lower edge, ends approximately at the level of the belt line and is connected there by way of hinges to an approximately horizontal covering which covers an opening behind the seats in the upward direction, wherein the first part is formed by a flexible net mounted in a frame, and wherein the covering is constructed as a plate-shaped covering.

Principal advantages achieved by means off the invention are that a reasonable-cost manufacturing of the wind deflection device and a good function are achieved in that only the first upright part of the wind deflection device is formed by a frame covered with a flexible net, but the second part is constructed as a plate-shaped covering which can simply be adapted to the contour of the inside lining of the vehicle.

Because of the impermeable plate-shaped construction, pieces of luggage on the rear seat unit are invisible from above and are not subjected to a direct sun radiation and UV-stress.

Another important advantage of the wind deflection device according to the invention is the fact that it can be folded together in a particularly space-saving manner. This is achieved in that, on the one hand, the plate-shaped covering is constructed in two parts, in which case the parts which are situated side-by-side in the transverse direction are releasably joined to one another in the operative position. On the other hand, the upright part can be folded together in two halves by means of provided lockable joints.

When the wind deflection device is not in use, the upright part is folded toward the rear and then both parts are folded together again, whereby a particularly compact folded package is achieved which can be accommodated without any problem even in vehicles with little cargo space.

Between the plate section and the adjoining lower frame of the first part, at least one hinge respectively is provided. In the embodiment shown in the drawings, two spaced hinges respectively are arranged per plate section.

In the operative position, the two adjoining plate sections are releasably connected with one another. For this purpose, either a releasable slide fastener or a releasable groove-and-tongue connection are provided. Both parts may also overlap in regions.

Other objects, advantages and novel features of the present invention will become apparent from the following detailed description of the invention when considered in conjunction with the accompanying drawings.

DETAILED DESCRIPTION OF THE DRAWINGS

Figure 1:
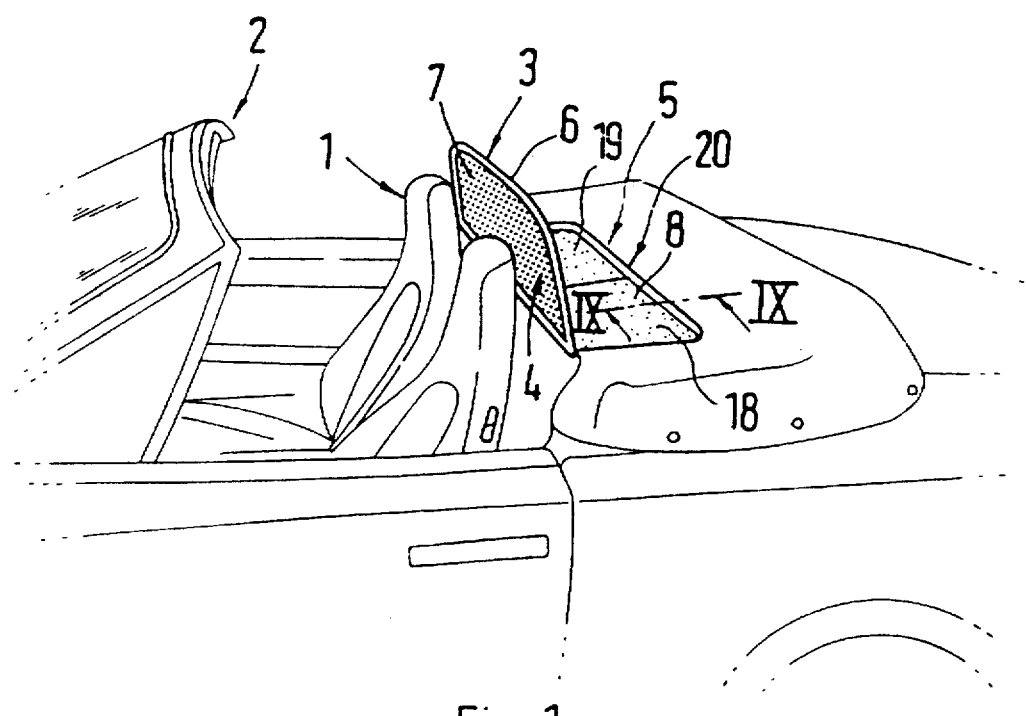
FIG. 1 is a perspective partial view diagonally from the front of a convertible having a wind deflection device which is arranged behind the seats and is in the operative position, constructed according to a preferred embodiment of the present invention.

As illustrated in FIG. 1 of the drawing, a wind deflection device 3 is arranged behind the seats 1 of the illustrated convertible and is composed of a first upright part 4 and a second, approximately horizontal part 5, which covers the rear space behind the seats 1 in the upward direction. The first upright part 4 is formed by a flexible net 7 mounted in a frame 6, whereas the second part 5 is constructed as a plate-shaped covering 8.

Figure 2:
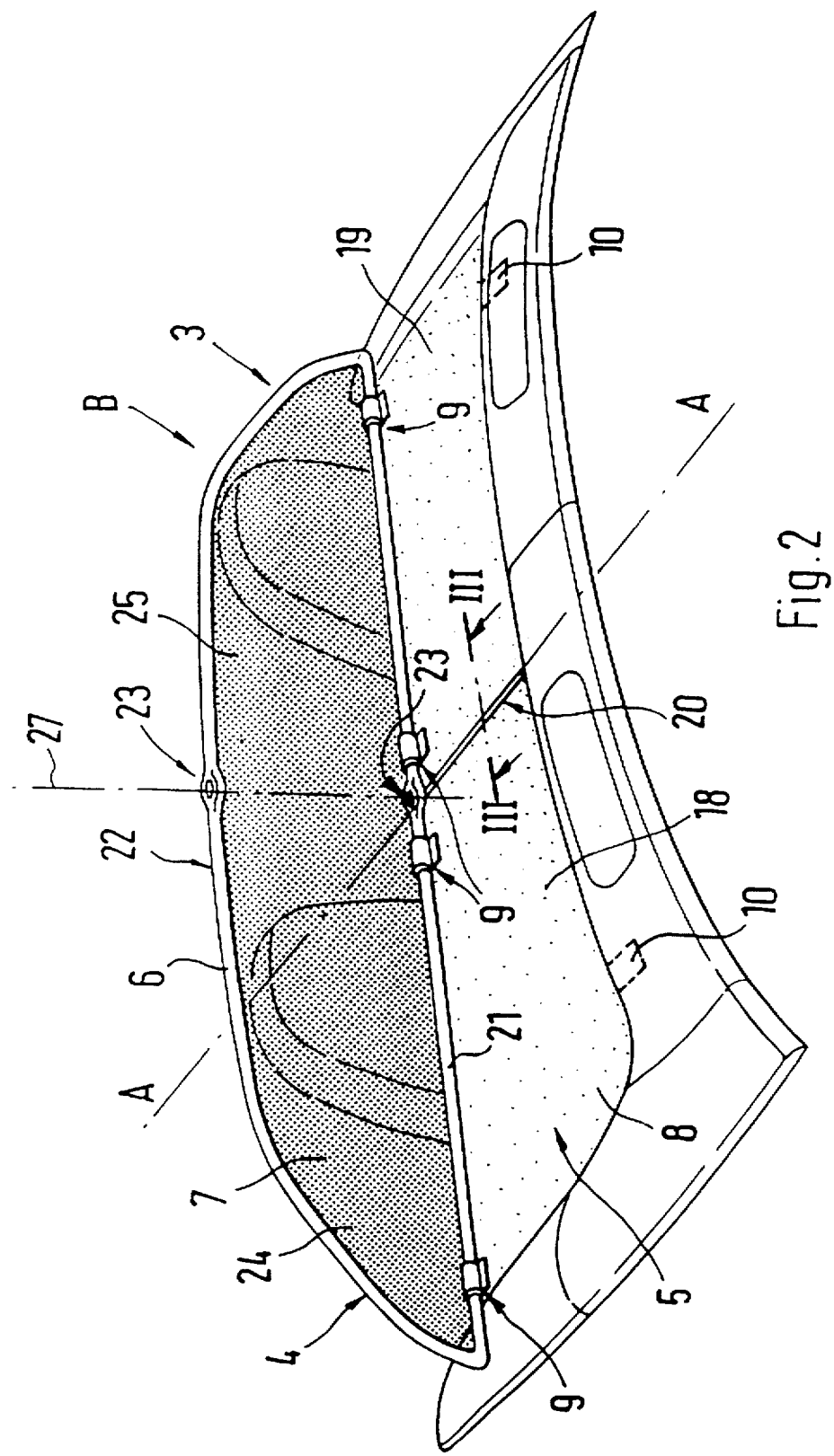
FIG. 2 is a perspective partial view diagonally from the rear of the wind deflection device and the adjoining vehicle body of FIG. 1.
Figure 9:
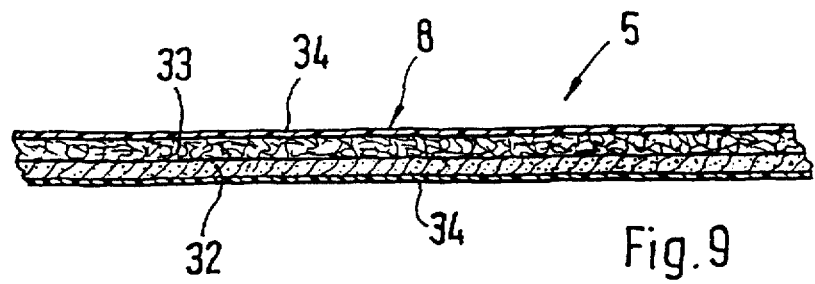
FIG. 9 is an enlarged sectional view taken along Line IX—IX of FIG. 1.

According to FIG. 2, the first upright part 4 is swivellably connected with the plate-shaped covering 8 by means of hinges 9. In the embodiment shown, this covering 8 is formed by a pasted hard-fiber plate (FIG. 9). However, it is also contemplated to construct the plate-shaped covering 8 as a plastic part which has a graining on its exterior side or is provided with an additional cover. The plate-shaped covering 8 covers luggage pieces which are situated on the rear seat unit which is situated underneath and is not shown in detail, so that this luggage is not visible from above.

Corresponding to FIGS. 1 and 2, the plate-shaped covering 8 is arranged approximately at the level of the belt line and is adapted to the circumferential contour of the rear space. The plate-shaped covering 8 prevents the entering of air into the area of the rear space situated underneath.

On the rear transversely extending edge of the plate-shaped covering 8, two projecting plug-in lugs 10 are arranged which extend in the longitudinal direction of the vehicle and which can be plugged into adjoining belt exit openings, which are not shown in detail, and are held in position in these.

Figure 4:
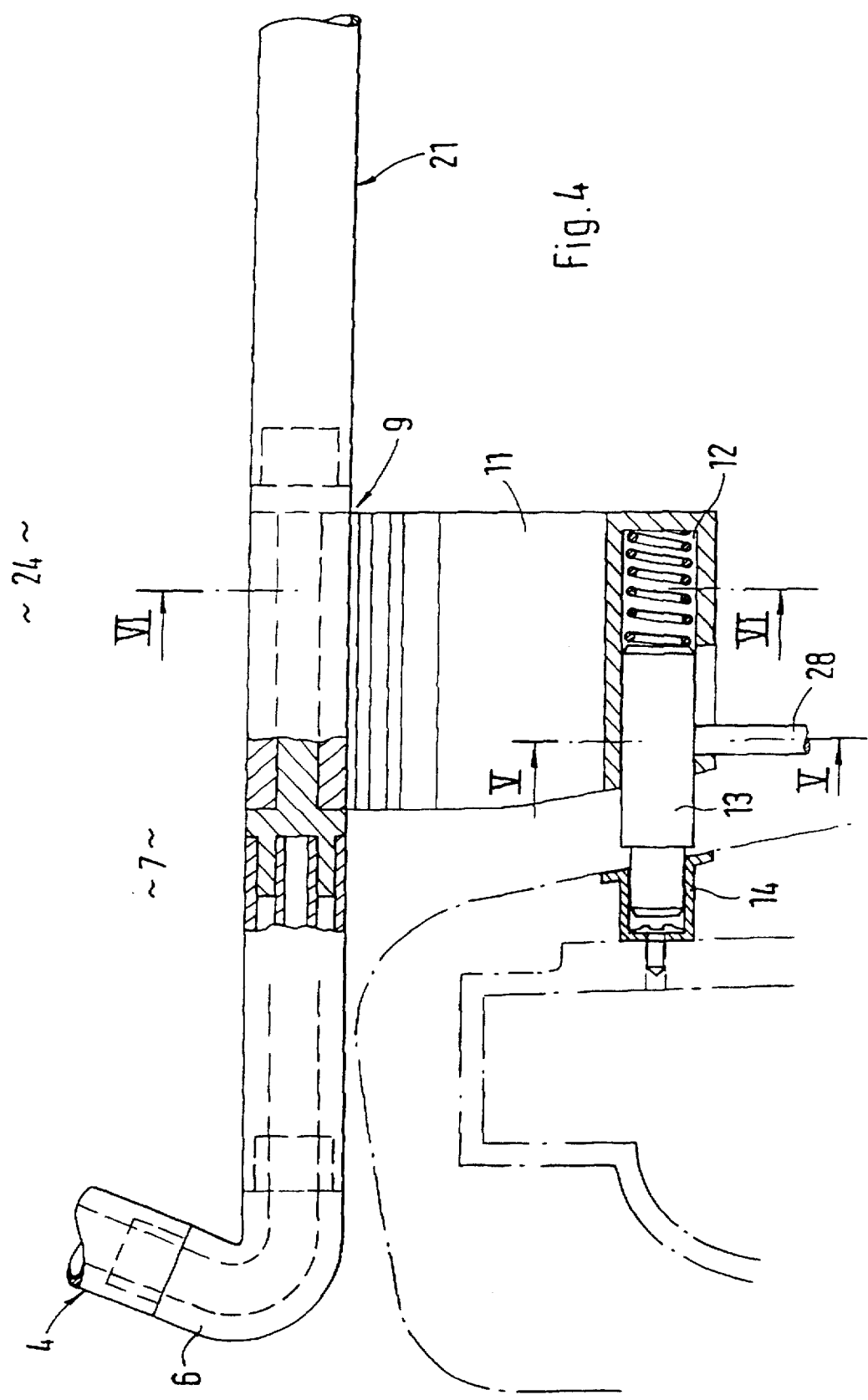
FIG. 4 is a partial view from the rear, partially as a sectional view of the body-side bearing of the wind deflection device of FIG. 1.
Figure 5:
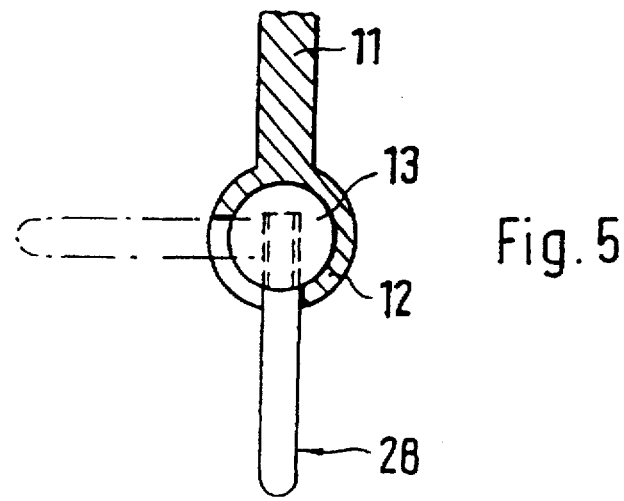
FIG. 5 is a sectional view taken along Line V—V of FIG. 4.
Figure 6:
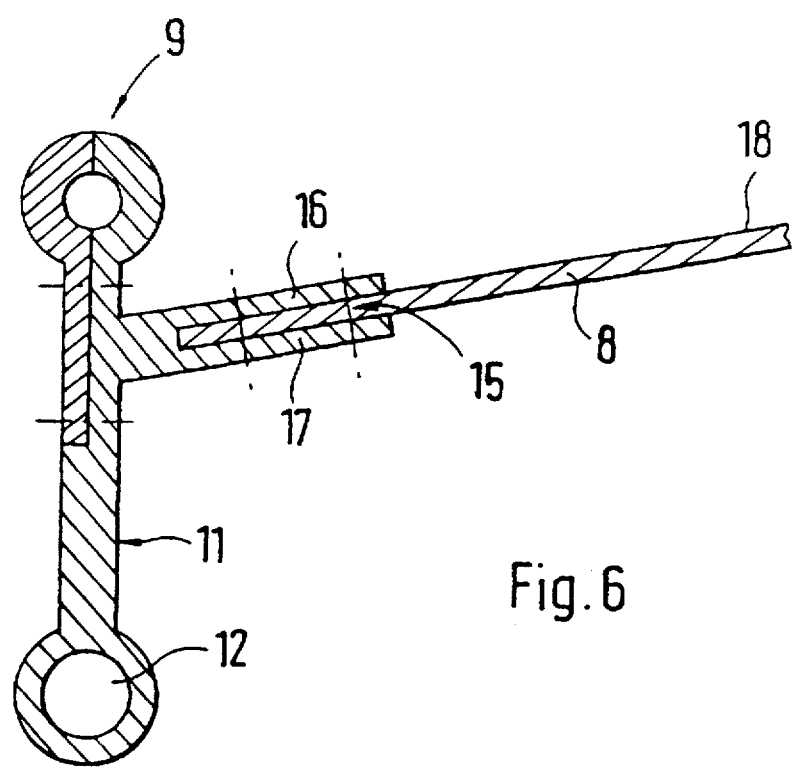
FIG. 6 is a sectional view taken along Line VI—VI of FIG. 4.

In the area of the laterally exterior hinges 9, a first hinge part 11 extends downward and has a receiving device 12 there for a spring-loaded bolt which extends in the transverse direction of the vehicle and which receiving device 12 engages in a body-side receiving element 14 when the wind deflection device 3 is mounted (FIG. 4). The spring-loaded bolt 13 can be displaced into the transverse direction and into the radial direction by means of a pin-shaped grip section 28 (FIGS. 4 and 5). The projecting grip section 28 is fixedly connected with the bolt 13. A U-shaped holding section 15 which is constructed in one piece with the upright hinge part 11 extends approximately horizontally or slightly diagonally and receives the forward end of the covering 8 between the webs 16, 17, the covering 8 being fixedly connected with the webs 16, 17.

The wind deflection device 3 according to the invention can be folded together in a particularly space-saving manner so that, in this condition, it requires little space in the vehicle.

This is achieved in that, on the one hand, the plate-shaped covering 8 is constructed in two parts. Viewed in the transverse direction of the vehicle, the two plate sections 18, 19 are arranged side-by-side, in which case the common connection area 20 in the embodiment is situated approximately in the area of a longitudinal center plane A—A of the vehicle.

Figure 3:
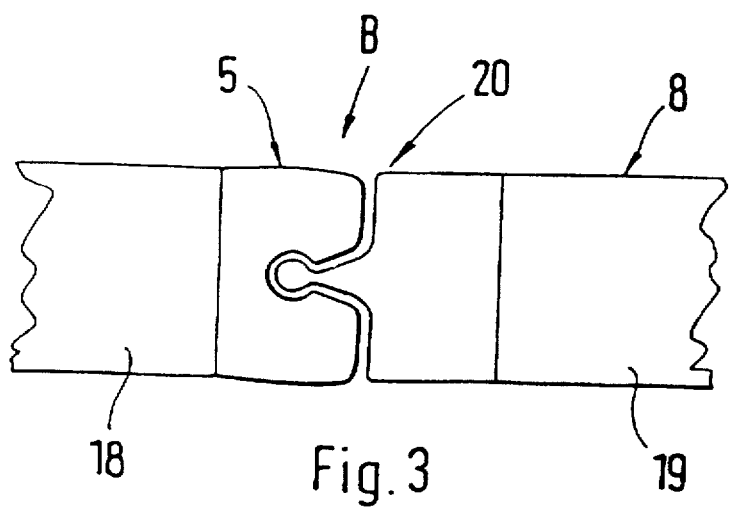
FIG. 3 is an enlarged sectional view taken along Line III—III of FIG. 2.

In the operative position B of the wind deflection device 3, both plate sections 18, 19 are connected with one another in a releasable manner. This can take place by means of a slide fastener, a groove and tongue connection or a partial overlapping (FIG. 3).

On the other hand, one detent joint 23 respectively is arranged in the area of the longitudinal center plane A—A of the vehicle on the upper and lower transversely extending frame section 21, 22 and divides the frame 6 into two halves 24, 25 situated side-by-side.

When the wind deflection device 3 is not in use, the first upright part 4 is folded toward the rear onto the second part 5. Then, because of the detent joints 23 of the frame 6 and the releasable connection of the two plate sections 18, 19, the two parts 4, 5 situated above one another can be folded together again. The two detent joints 23 are connected with one another by way of an axis around which the parts 4, 5 of the wind deflection device 3 which are situated above one another can be folded together again.

Figure 7:
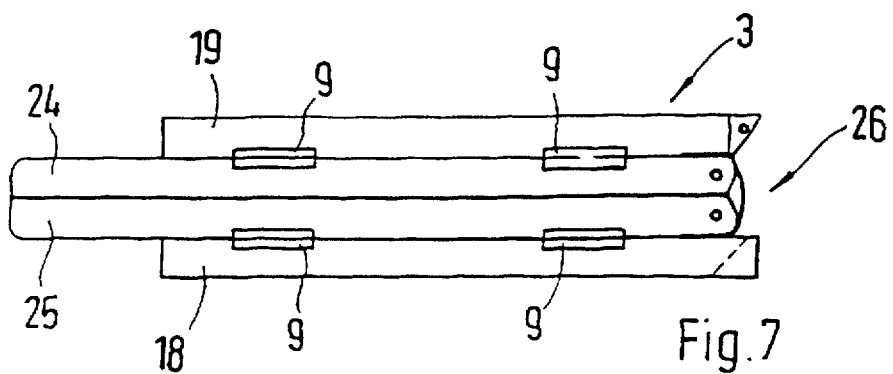
FIG. 7 is a view from the top of the folded-together wind deflection device of FIG. 1.

The folded package 26 illustrated in FIG. 7 is composed of the interior halves 24, 25 of the first part 4 and of the exterior plate sections 18, 19 of the second part 5. Devices may be provided for fixing the folded package 26 in the folded-together position.

Figure 8:
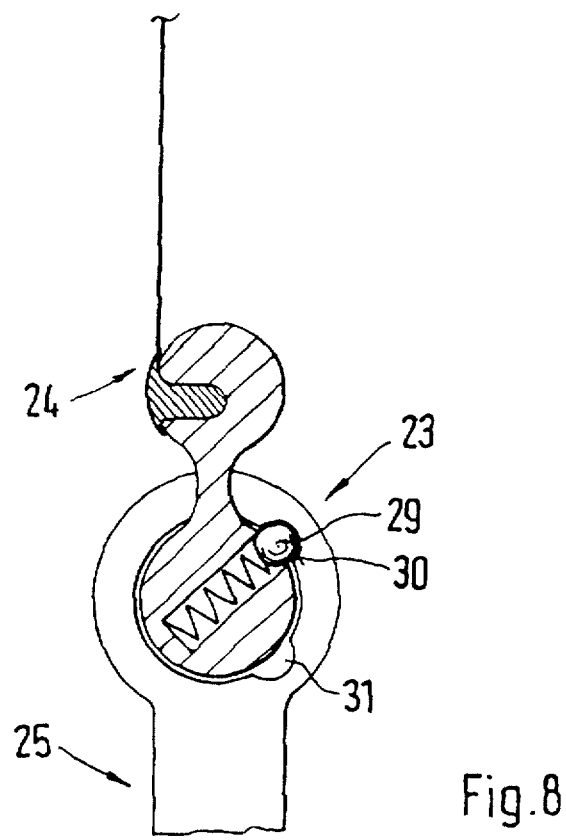
FIG. 8 is a sectional view taken along Line VIII—VIII of FIG. 2 of the detent joint.

FIG. 8 shows the detent joint 23 between the halves 24, 25 of the first part 4, in which case, by means of a spring-loaded ball 29 and two detents 30, 31, the positions of the halves 24, 25 are defined in the operative position and in the folded-together position.

FIG. 9 illustrates the construction of the plate-shaped covering 8. The top side of the hard-fiber plate 32 is provided with a padding 33. The exterior sides of the padding 33 and of the hard-fiber plate 32 are each covered by a cover 34 made of synthetic leather or a folding top material.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Wind deflection device for a convertible which is arranged behind a row of seats in a vehicle interior and, in its operative position, comprises a first upright part which extends beyond the seats in the upward direction and along the whole width of the interior and which, with its lower edge, ends approximately at a level of a vehicle belt line and is connected there by way of hinges to an approximately horizontal covering which covers an opening behind the seats in the upward direction, wherein the first part is formed by a flexible net mounted in a frame, and wherein the covering is constructed as a plate-shaped covering which in an in use position precludes visibility from above of objects behind the seats.

2. Wind deflection device according to claim 1, wherein the plate-shaped covering is constructed in two parts including first and second plate sections which are situated side-by-side viewed in a transverse direction of the vehicle, each of said plate sections being connected in an articulated manner by way of at least one hinge with a lower frame section of the first part.

3. Wind deflection device according to claim 2, wherein the two plate sections are releasably connected with one another in the area of a longitudinal center plane of the vehicle in the operative position of the wind deflection device.

4. Wind deflection device according to claim 2, wherein each plate section is formed by a pasted hard-fiber plate or by a plastic part.

5. Wind deflection device according to claim 3, wherein each plate section is formed by a pasted hard-fiber plate or by a plastic part.

6. Wind deflection device according to claim 1, wherein in the area of a longitudinal center plane of the vehicle, one detent joint respectively is arranged on an upper and a lower transversely extending frame section of the first part.

7. Wind deflection device according to claim 6, wherein the first part is foldable toward the rear onto the covering, and wherein both the first part and the covering, which are disposed above one another, can be folded together again about an axis which connects the detent joints with one another.

8. Wind deflection device according to claim 2, wherein in the area of a longitudinal center plane of the vehicle, one detent joint respectively is arranged on an upper and a lower transversely extending frame section of the first part, wherein the first part is foldable toward the rear onto the covering, and wherein both the first part and the covering, which are disposed above one another, can be folded together again about an axis which connects the detent joints with one another.

9. Wind deflection device according to claim 3, wherein in the area of a longitudinal center plane of the vehicle, one detent joint respectively is arranged on an upper and a lower transversely extending frame section of the first part, wherein the first part is foldable toward the rear onto the covering, and wherein both the first part and the covering, which are disposed above one another, can be folded together again about an axis which connects the detent joints with one another.

10. Wind deflection device according to claim 3, comprising connecting means for connecting the two plate sections to one another in the operating position of the wind deflection device.

11. Wind deflection device assembly for a convertible having at least one seat, comprising:

a flexible net part disposable in use behind the at least one seat in a substantially vertical plane, and an impermeable plate shaped covering hingedly connected to the flexible net part and extending horizontally in use to cover a storage space behind the at least one seat and to preclude viewing of said storage space from above said impermeable covering.

12. Wind deflection device assembly according to claim 11, wherein said flexible net is supported on its edges by a frame which is hingedly connected with the impermeable covering.

13. Wind deflection device assembly according to claim 12, wherein the impermeable covering is formed of at least one rigid opaque plastic part.

14. Wind deflection device assembly according to claim 12, wherein the impermeable covering is formed of at least one pasted opaque hard fiber plate.

15. Wind deflection device for a convertible which is arranged behind a row of seats in a vehicle interior and, in its operative position, comprises a first upright part which extends beyond the seats in the upward direction and along the whole width of the interior and which, with its lower edge, ends approximately at a level of a vehicle belt line and is connected there by way of hinges to an approximately horizontal covering which covers an opening behind the seats in the upward direction, wherein the first part is formed by a flexible net mounted in a frame, wherein the covering is constructed as a plate-shaped covering, wherein the plate-shaped covering is constructed in two parts including first and second plate sections which are situated side-by-side viewed in a transverse direction of the vehicle, each of said plate sections being connected in an articulated manner by way of at least one hinge with a lower frame section of the first part, and wherein the two plate sections are releasably connected with one another in the area of a longitudinal center plane of the vehicle in the operative position of the wind deflection device.

16. Wind deflection device according to claim 15, comprising connecting means for connecting the two plate sections to one another in the operating position of the wind deflection device.

17. Wind deflection device for a convertible which is arranged behind a row of seats in a vehicle interior and, in its operative position, comprises a first upright part which extends beyond the seats in the upward direction and along the whole width of the interior and which, with its lower edge, ends approximately at a level of a vehicle belt line and is connected there by way of hinges to an approximately horizontal covering which covers an opening behind the seats in the upward direction, wherein the first part is formed by a flexible net mounted in a frame, wherein the covering is constructed as a plate-shaped covering, and wherein in the area of a longitudinal center plane of the vehicle, one detent joint respectively is arranged on an upper and a lower transversely extending frame section of the first part.

* * * * *